United States Patent
Raden et al.

(10) Patent No.: US 6,409,178 B1
(45) Date of Patent: Jun. 25, 2002

(54) MULTIPLE LAYER GASKET HAVING SELECTIVELY REMOVABLE SPACER LAYERS AND VISUAL INDICATORS

(75) Inventors: Edward Raden, Downers Grove; William A. Johnson, Naperville, both of IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/475,924

(22) Filed: Dec. 30, 1999

Related U.S. Application Data (63) Continuation-in-part of application No. 09/328,746, filed on Jun. 9, 1999.

(51) Int. Cl.⁷ .............................. F16J 15/08; F02F 11/00
(52) U.S. Cl. .................... 277/592; 277/591; 277/598; 277/317; 277/321
(58) Field of Search ................................. 277/591, 592, 277/601, 608, 627, 594, 317, 321, 596, 598, 595

(56) References Cited

U.S. PATENT DOCUMENTS

| | | | | |
|---|---|---|---|---|
| 2,072,862 A | * | 3/1937 | Bolfe ........................ 277/592 |
| 2,089,254 A | * | 8/1937 | Fitzgerald ............... 277/592 X |
| 2,114,442 A | * | 4/1938 | Fitzgerald ............... 277/592 X |
| 2,695,186 A | * | 11/1954 | Balfe ........................ 277/595 |
| 3,396,711 A | | 8/1968 | Fangman et al. |
| 3,885,889 A | | 5/1975 | Bares et al. |
| 4,103,913 A | * | 8/1978 | McDowell ............... 277/596 X |
| 4,211,205 A | | 7/1980 | Lockhart |
| 4,630,835 A | * | 12/1986 | Locacius ................ 277/596 X |
| 4,648,607 A | * | 3/1987 | Yamada et al. ............. 277/598 |
| 4,776,601 A | * | 10/1988 | Yamada ..................... 277/598 |
| 4,830,698 A | * | 5/1989 | DeCore et al. ......... 277/596 X |
| 4,964,293 A | * | 10/1990 | Inoue et al. ............. 277/592 X |
| 5,141,237 A | * | 8/1992 | Yamada et al. ............. 277/317 |
| 5,161,809 A | * | 11/1992 | Matsushita et al. ......... 277/601 |
| 5,210,943 A | * | 5/1993 | Berkun et al. ............. 29/888.3 |
| 5,232,228 A | * | 8/1993 | Miyaoh .................. 277/317 X |
| 5,277,434 A | * | 1/1994 | Kestly et al. ................ 277/592 |
| 5,281,464 A | * | 1/1994 | Sekioka et al. ......... 277/598 X |
| 5,431,418 A | * | 7/1995 | Hagiwara et al. ........... 277/592 |
| 5,472,217 A | * | 12/1995 | Hagiwara et al. ........... 277/596 |
| 5,681,048 A | * | 10/1997 | Tronel ........................ 277/592 |
| 5,806,857 A | * | 9/1998 | Mockenhaupt et al. . 277/321 X |
| 6,027,124 A | * | 2/2000 | Ishida et al. ............. 277/594 X |
| 6,076,833 A | * | 6/2000 | Geshi ..................... 277/594 X |
| 6,113,109 A | * | 9/2000 | Lieb et al. ............... 277/594 X |

FOREIGN PATENT DOCUMENTS

EP 516407 * 12/1992 ................. 277/321

* cited by examiner

Primary Examiner—Robert G. Santos
(74) Attorney, Agent, or Firm—Rader, Fishman & Grauer PLLC (57) ABSTRACT

A multi-layered gasket for a combustion engine having a central gasket layer and a plurality of active and spacer gasket layers that are removably secured together is disclosed. The active layers are arranged in face-to-face engagement with the spacer layers in an alternating manner with the central layer being positioned in the center of the gasket. The spacer layers may be selectively removed or added to vary the compression ratio of the engine. Alternatively, spacer layers may be selectively substituted With additional spacer layers having differing thicknesses to selectively vary the compression ratio of the engine. Each of the gasket layers are provided with a visual indicator to distinguish the respective layers from one another. Retaining mechanisms for removably securing the gasket layers together are also disclosed.

23 Claims, 4 Drawing Sheets

MULTIPLE LAYER GASKET HAVING SELECTIVELY REMOVABLE SPACER LAYERS AND VISUAL INDICATORS

RELATED APPLICATIONS

The present application is a Continuation-in-Part of U.S. application Ser. No. 09/328,746, filed Jun. 9, 1999, entitled "Multiple Layer Gasket Having Selectively Removable Spacer Layers." Applicant incorporates the application herein by reference and claims priority this earlier filed applications pursuant to 35 U.S.C. § 120.

FIELD OF THE INVENTION

The present invention relates to a multiple layer steel laminate gasket. More particularly, the invention relates to a multiple layer steel laminate gasket having a plurality of spacer layers sandwiched in an alternating manner between active layers and a central layer, wherein the spacer layers may be selectively removed or substituted with additional spacer layers to vary the compression ratio of a combustion engine.

BACKGROUND OF THE INVENTION

Gaskets are often used to seal mating mechanical components. In one common application, a cylinder head gasket for an internal combustion engine is formed from a plurality of metallic gasket layers laminated together, with the gasket being positioned between the engine block and cylinder head of an internal combustion engine. The gasket layers are designed to have a predetermined composite thickness to maintain a desired combustion ratio for the engine. The basket layers are typically permanently secured together by welding or adhesive to provide a single gasket unit that is mounted between the engine block and cylinder head in one assembly step. Gaskets of this type are undesirable as there is no means for selectively removing gasket layers to cost-effectively increase or decrease the overall thickness of the gasket such that the compression ratio of the engine may be modified. Accordingly, to modify the compression ration of the engine a new casket assembly is required, or the engine components must be redesigned.

Therefore, there exists a need for a gasket assembly that may be selectively modified to selectively vary the overall thickness of the gasket to modify the compression ratio of an internal combustion engine.

SUMMARY OF THE INVENTION

The present invention is directed to a multiple layer gasket for sealing mating components in a combustion engine, wherein the overall thickness of the gasket assembly may be selectively varied to modify the compression ratio of the engine.

The gasket assembly has a central layer, at least two active layers and at least one selectively removable spacer layer. The active layers are preferably constructed of spring steel such that the active layers deform upon compression to seal cracks and voids in contacting surfaces. The central layer is arranged between the active layers and serves to define an initial standard, pre-determined thickness of the gasket assembly. The spacer layer is provided to vary the thickness of the gasket assembly.

The central, active and spacer layers are each provided with a plurality of corresponding apertures extending therethrough. The apertures of the respective gasket layers are positioned to be aligned with one another, as well as with corresponding apertures in the mating mechanical component being sealed, when the gasket assembly is fully assembled and positioned between the mating mechanical components. In a preferred embodiment, the active layers are positioned so as to be in contact with the mating mechanical components, while the spacer layers are sandwiched between an adjacent active layer and the central layer. Thus, the active layers serve to seal cracks and voids on mounting surfaces of the mating components, as well as sealing against imperfections on the surfaces of the spacer layers.

In accordance with the invention, one or more spacer layers may be selectively added or removed from the gasket assembly to selectively lower or increase the compression ratio of the engine, respectively. Alternatively, one or more spacer layers can be substituted with one or more additional spacer layers that have thicknesses that differ from the spacer layers positioned within the gasket assembly to selectively lower or increase the compression ratio of the engine. When it is desired to lower the compression ratio of the engine, spacer layers are either added or removed and substituted with additional spacer layers that have thicknesses that are greater than those being removed. Conversely, to increase the compression ratio, spacer layers are simply removed from the gasket assembly or spacer layers are removed and substituted with additional spacer layers having thicknesses that are less than the thicknesses of the spacer layers being removed. To achieve the maximum compression ratio for the engine, all of the spacer layers may be removed to provide a gasket assembly having a minimum thickness defined by the active layers.

Because the thickness of the respective gasket layers (central, active and spacer layers) are not clearly visible to the naked eye, it is preferred that at least the central layer be provided with a visual indicator, such as a color indicator, an alpha-numeric marking, a symbol, or the like. The visual indicator enables the respective gasket layers to be easily distinguished from one another. In one embodiment, the central layer has an elastomeric coating, in the form of a bead, extending along the periphery of the cylinder bore openings of the central gasket layer, with the elastomeric coating being dyed during the manufacturing process a first predetermined color. In addition to serving as a visual indicator to identify the central gasket layer, the bead also improves the sealing properties of the central layer. The active layers are preferably completely coated on both the top and bottom surfaces with an elastomeric coating that is dived with a second predetermined color. The elastomeric coating provides increased sealing effectiveness and a visual indicator to provide distinguishability between the action layers and the spacer and central layers. The space layers arc preferably provided with visual indications, such as indicia, to indicate the thickness of each spacer layer, thereby distinguishing the spacer layers from one another.

In accordance with another aspect of the invention, the active layers and spacer layers are removably secured together with retaining mechanisms to permit selective addition or removal of the spacer layers. In one embodiment, the retaining mechanisms include removable fasteners that extend through aligned retaining apertures formed in the active and spacer layers. Preferably, the retaining apertures are positioned adjacent a peripheral edge of the gasket layers such that the removable fasteners will not contact the mating components when the gasket assembly is positioned therebetween. Thus, sealing effectiveness will not be compromised.

In an alternative embodiment, the gasket layers are provided with aligned nesting depressions to removably secure and align the gasket layers. The nesting depressions are formed in bottom faces of the respective active and spacer layers such that an apex extends upwardly from top faces of the active and spacer layers. The apex of each nesting depression is receivable within a nesting depression of an adjacent gasket layer such that adjacent layers will be prevented from sliding apart and the gasket layers are maintained in alignment. The nesting depressions are preferably formed adjacent to or along the peripheral edge of the gasket layers such that the apex of the nesting depressions do not compromise sealing effectiveness of the gasket assembly when the gasket assembly is positioned between the mating components.

The use of the gasket assembly of the present invention permits quick and cost-effective modification of the compression ratio of an engine without having to provide a new gasket assembly or modify the engine components by adding or removing spacer layers or substituting the spacer layers with additional spacer layers of varying thicknesses. The visual indicators serve to insure proper assembly of the gasket assembly.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
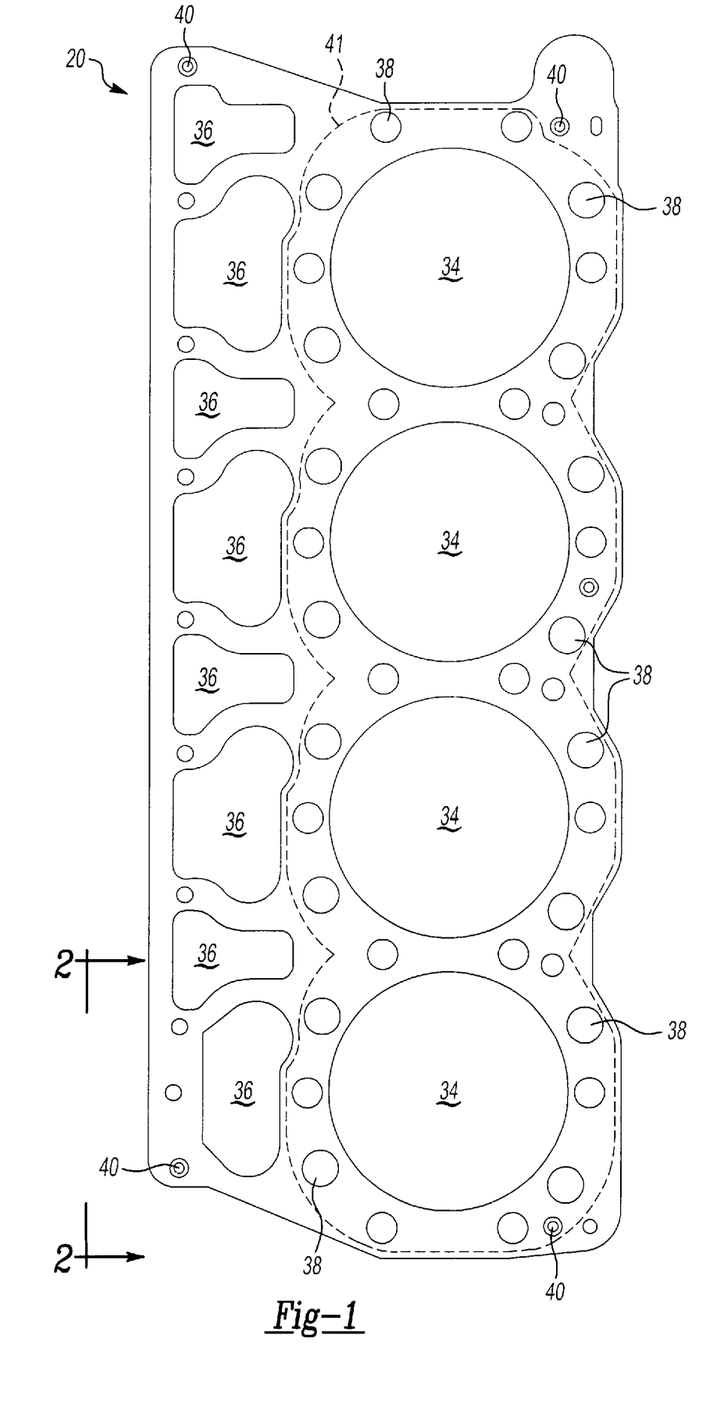
FIG. 1 is a plan view of a multiple-layer metallic gasket assembly in accordance with the present invention.
Figure 2:
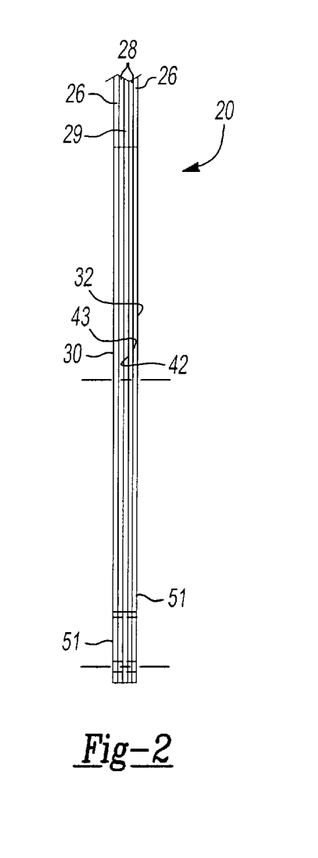
FIG. 2 is a cross-sectional view of the gasket assembly, taken along lines 2—2 of FIG. 1.
Figure 3:
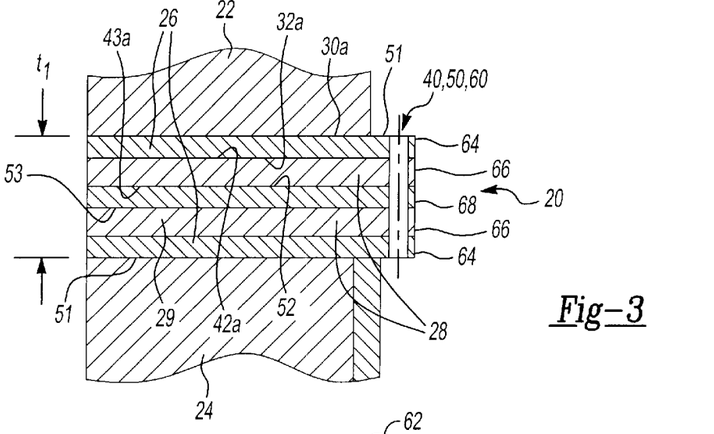
FIG. 3 is an enlarged partial cross-sectional view of the gasket assembly positioned between mating mechanical components.

FIGS. 1–9 disclose a multiple layer gasket assembly 20 for sealing mating mechanical components 22 and 24 (as best seen in FIG. 3). In the disclosed embodiment, gasket assembly 20 is a cylinder head gasket assembly used for sealing a cylinder head 22 and an engine block 24. However, the present invention is not limited to cylinder head gaskets and it may be used with other gasket applications. Because seals on cylinder head gasket assemblies must withstand high temperatures, the gasket assembly 20 is generally preferably formed predominantly from metal, and includes multiple metallic gasket layers. The metallic gasket layers of the gasket assembly 20 are sized and shaped to fit and seal a corresponding mating surface.

Gasket assembly 20 has at least two active gasket layers 26, at least one spacer gasket layer 28 and a central gasket layer 29. Preferably each gasket layer has a length that is slightly longer than the overall length of mating components 22 and 24 such that fastening devices that hold the gasket layers together will not interfere with the functionality of the gasket assembly 20. However, gasket assembly 20 may include more than two active layers 26 and more than one spacer layer 28.

Figures 4, 5:
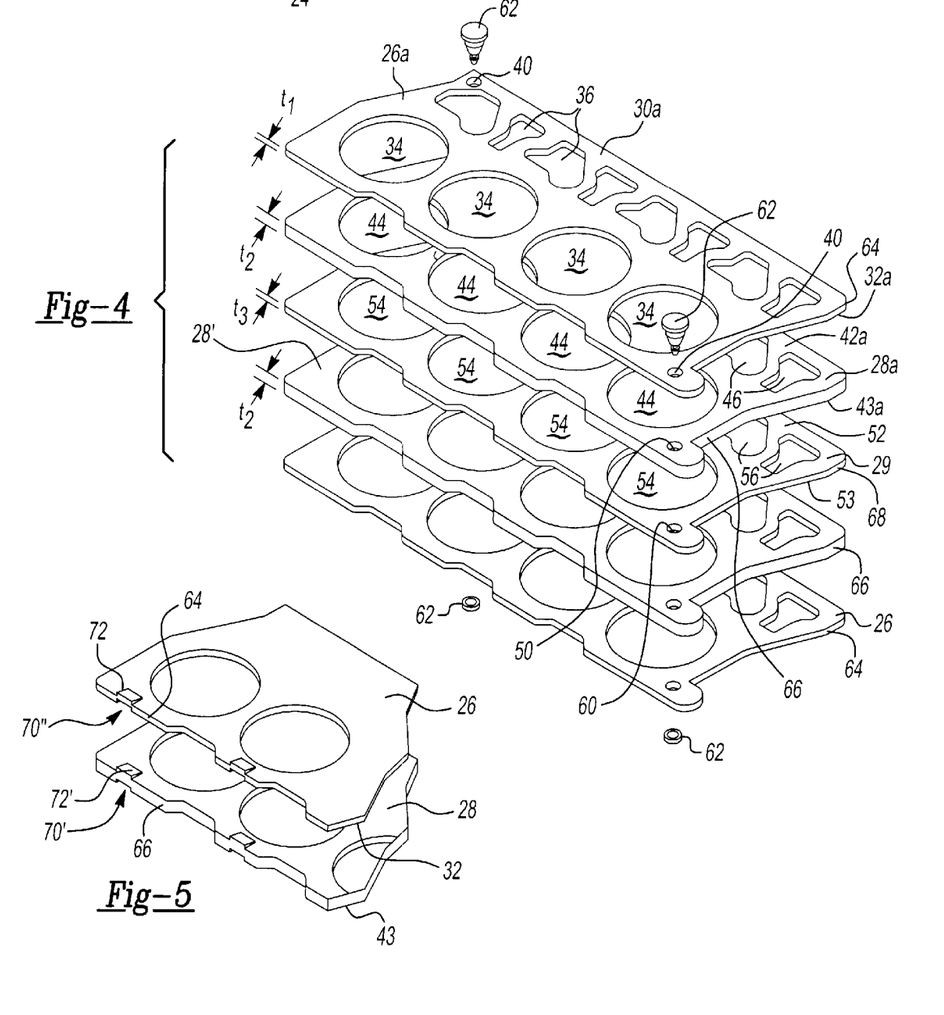
FIG. 4 is a partially exploded view of the gasket assembly provided with a removable retaining mechanism in accordance with the present invention.
FIG. 5 is a partially exploded view of the gasket assembly provided with an alternative retaining mechanism in accordance with the present invention.

As best seen in FIG. 4, active layers 26 include opposing top and bottom faces 30 and 32 that define a thickness $t_1$. It is preferred that active layers 26 all have the substantially the same thickness $t_1$ such that active layers 26 may be mass-produced in a cost-effective manner. A plurality of apertures 34, 36, 38 and 40 are formed through active layers 26. Apertures 34, 36, 38 and 40 include: cylinder bore openings 34, oil and water ports 36, bolt holes 38 and retaining apertures 40. Retaining apertures 40 will be explained in further detail below. Active layers 26 may also be provided with an embossed sealing bead 41 formed around the periphery of cylinder bore openings 34. During operation, sealing bead 41 deforms upon compression to seal cracks and voids in contacting surfaces.

Similar to active layers 26 spacer layers 28 include opposing top and bottom faces 42 and 43 that define a thickness $t_2$. Thickness $t_2$ may be greater than, less than or equal to thickness $t_1$ of active layer 26. Further, unlike active layers 26, each spacer layer 28 may have different thicknesses $t_2$, as will be explained in greater detail below. A plurality of apertures 44, 46, 48 and 50, which correspond to apertures 34, 36, 38 and 40 of active layers 26, are formed through spacer layers 28.

Central gasket layer 29 includes opposing top and bottom faces 52 and 53 that define a thickness $t_3$. Thickness $t_1$ dictates the initial operating parameters of gasket assembly 20 to provide a standard predetermined compression ratio. A plurality of apertures 54, 56, 58 and 60, which correspond to the apertures in active and spacer layers 26 and 28, are formed through central gasket layer 29.

Referring to FIGS. 3–5, to properly assemble gasket assembly 20, central gasket 29 is positioned in the center of gasket assembly 20. An active layer 26 is positioned on either side of central gasket layer 29, with a spacer layer 28 being positioned between each active layer 26 and central layer 29. Layers 26, 28 and 29 are arranged in face-to-face engagement with apertures 34, 36, 38 and 40 of active layers 26 aligned with apertures 44, 46, 48 and 50 of spacer layers 28. Similarly, apertures 54, 56, 58 and 60 of central layer 29 are aligned with apertures 44, 46, 48 and 50 of adjacent spacer layers 28. Active layers 26 are preferably constructed of spring steel or other suitable resilient material such that when active layers 26 contact mating surfaces of spacer layers 28 or mating components 22 and 24, active layers 26 will easily compress to seal voids, cracks and other imperfections. Accordingly, it is preferred that spacer layers 28 are arranged in an alternating manner with active layers 26 and central layer 29 with two active layers 26 positioned so as to define outermost mounting surfaces 51 for gasket assembly 20. For example, referring to FIGS. 3 and 5, top face 30a of active layer 26a contacts mating component 22. Bottom face 32a of active layer 26a contacts top face 42a of spacer layer 28a. Top face 52 of central layer 29 contacts bottom face 43a of spacer layer 28a, such that spacer layers 28 are sandwiched between an adjacent active layer 26 and central layer 29.

Once assembled and positioned between mating components 22 and 24, the gasket assembly is defined by an overall installed thickness $T_1$. Active layers 26, which are operatively positioned in contact with mating components 22 and 24, easily compress to seal voids in mating components 22 and 24 and adjacent spacer layers 28. Spacer layers 28, typically constructed of steel, maintain the proper overall thickness $T_1$ of gasket assembly to define the compression ratio of the combustion engine, as will be explained below in greater detail.

Once active layers 26, spacer layers 28 and central layer 29 are properly aligned and assembled in face-to-face engagement, it is preferred that removable fasteners 62 are positioned through aligned retaining apertures 40, 50, and 60 respectively. Removable fasteners 62 removably secure gasket assembly 20 together as a single gasket, while maintaining the proper alignment of gasket assembly 20. Removable fasteners 62 may include push pin assemblies, as featured in FIG. 4, wherein a push pin extends through the aligned retaining apertures 40, 50 and 60 and a push nut removably secures active layers 26, spacer layers 28 and central layer 29 together into a single gasket unit. Thus, quick and easy assembly between mating components is achieved while insuring proper alignment of the gasket layers 26, 28 and 29. Other suitable removable fasteners 62, such as bolt assemblies are also contemplated. It is preferred that retaining apertures 40, 50 and 60 are positioned adjacent to a peripheral edge 64, 66 and 68 of active, spacer and central layers 26, 28, and 29, respectively, so as not to be disposed between mating components 22 and 24. Therefore, sealing effectiveness of gasket assembly 20 is not compromised by removable fasteners 62.

In an alternative embodiment, active layers 26, spacer layers 28 and central layer 29 may be provided with nesting depressions 70, as best seen in FIG. 5, to selectively secure and align successive layers 26, 28 and 29 together, thereby eliminating the need for additional fasteners. Nesting depressions 70 are preferably formed in bottom faces 32, 43 and 53 of active, spacer and central layers 26, 28, and 29, respectively, and have an apex 72 that extends upwardly from top surfaces 30, 42 and 52 of active and spacer layers 26 and 28 and central layer 29, respectively. Thus, successive active layers, spacer layers and central layer may be stacked upon one another during assembly. In accordance with the invention, apex 72' of nesting depression 70' of a spacer layer 28 is receivable within nesting depression 70" of adjacent active layer 26, such that successive layers are stacked upon one another in proper alignment while secured against sliding apart. As with retaining apertures 40, 50 and 60, respectively, it is preferred that nesting depressions 70 are formed along or adjacent to the peripheral edges 64, 66 and 68 of active, spacer and central layers 26, 28 and 29, respectively, such that nesting depressions do not compromise the sealing effectiveness of gasket assembly 20. While nesting depressions 70 are shown having a triangular cross-sectional shape. it is understood that any shape may be employed. Further, it is understood that nesting depressions 70 may be used alone or in combination with removable fasteners 62.

Removable fasteners 62 and nesting depressions 70 advantageously permit quick and easy assembly and disassembly of gasket assembly 20. In accordance with the present invention, selective assembly/disassembly is desired to allow spacer layers 28 to be selectively added or removed to vary the compression ratio of the engine. In turbo-charged engines that have limited performance capabilities, it is often desired to lower the compression ratio of the engine to generate a "boost" for the turbo of the engine. Accordingly, to cost effectively lower the compression ratio Without having to provide a new gasket assembly or modify the engine components, removable fasteners 62 are removed from gasket assembly 20, or nesting depressions 70 are disengaged from one another, thereby permitting quick and easy disassembly of gasket assembly 20. Once disassembled, one or more additional spacer layers 28 may be added to gasket assembly 20, thereby increasing the overall thickness $T_1$ of gasket assembly 20, to selectively lower the compression ratio of the engine. Alternatively, one or more spacer layers 28' may be selectively substituted for spacer layers 28, where spacer layers 28' have a thickness that is greater than the thickness $t_2$ of the spacer layer 28 to increase the overall installed thickness $T_1$ of gasket assembly 20. Once spacer layers 28 are added or substituted with spacer layers 28', removable fasteners resecure active, spacer and central layers 26, 28 and 29 together.

Figure 6:
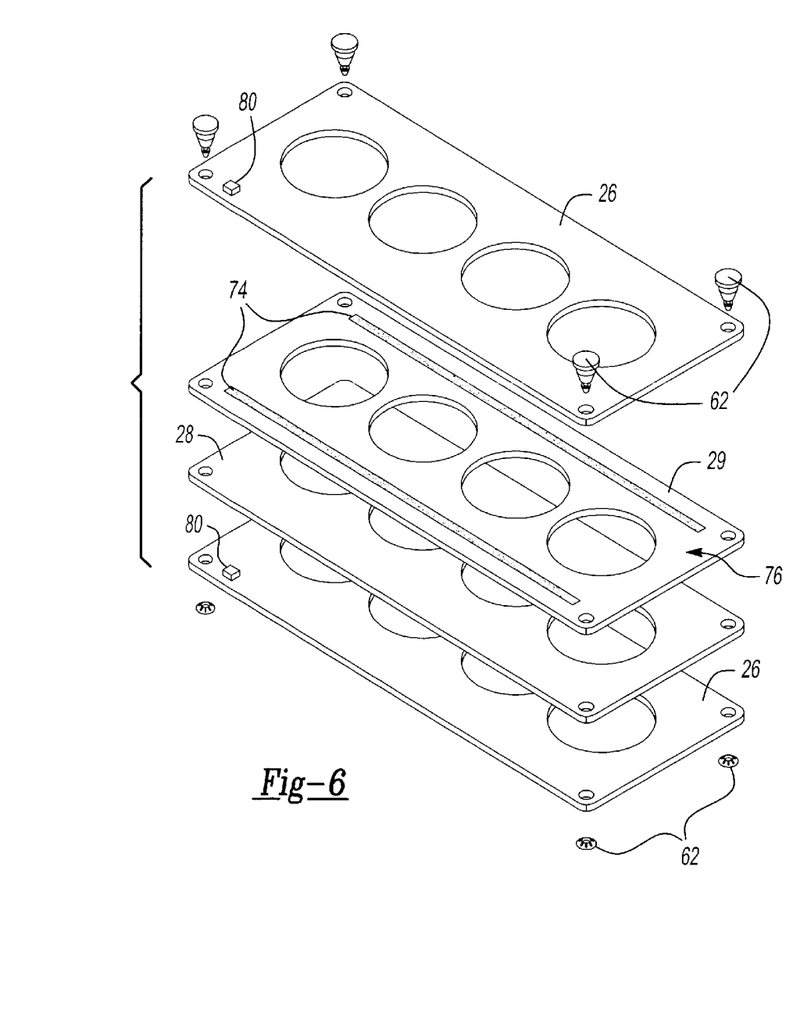
FIGS. 6–8 are schematic views of the gasket assembly depicting alternate arrangements of the gasket layers in accordance with the invention.
Figure 7:
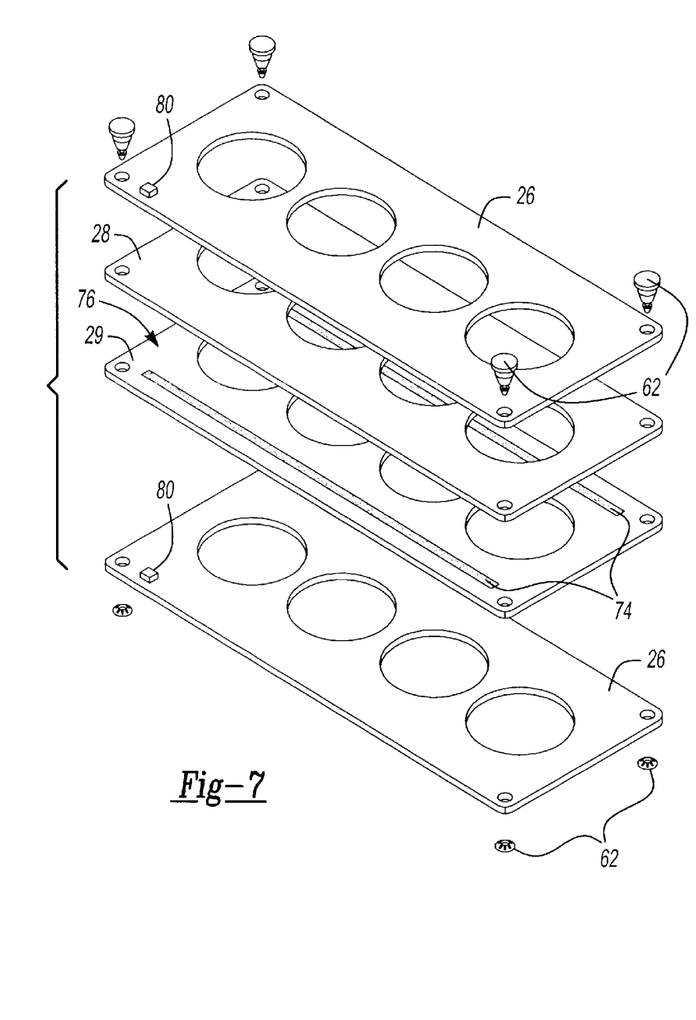
Figure 8:
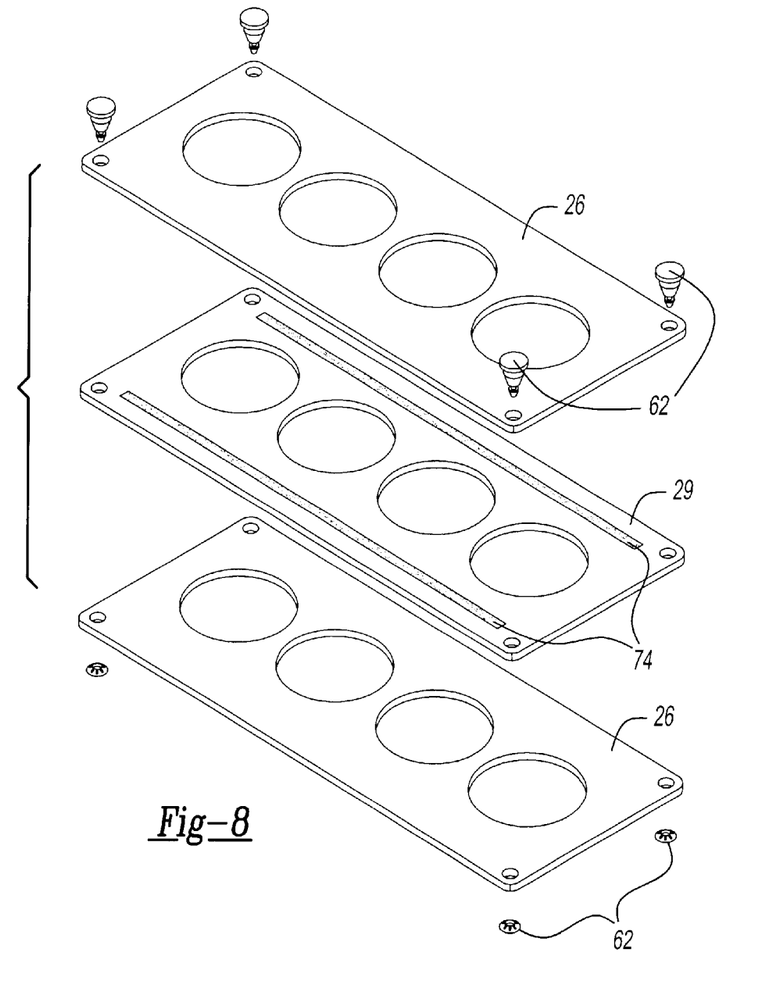

Conversely, referring to FIGS. 6–8, to increase the compression ratio of the engine, spacer layers 28 may be selectively removed in a similar manner to reduce the overall installed thickness $T_1$. For example. gasket assembly 20 may only employ one spacer layer 28 that is sandwiched between an active layer 26 and central layer 29. In such an arrangement, the second active layer 26 is arranged in face-to-face contact directly with central layer 29, as seen in FIGS. 6 and 7. Alternatively, spacer layer 28 may be substituted with one or more spacer layers 28' having a thickness that is less than the thickness $t_2$ of spacer layers 28. Further, to achieve a maximum compression ratio for the engine, all of spacer layers 28 may be removed from gasket assembly 20 to such that the overall installed thickness $T_1$ is minimized, being defined by the collective thickness of active layers 26 and central layer 29, as seen in FIG. 8.

In accordance with another aspect of the invention, to insure proper assembly of gasket assembly 20, thereby preventing coolant or combustion leakage and engine failure, it is preferred that visual indicators are provided for gasket layers 26, 28 and 29. In one preferred embodiment, central layer 29 is provided with an elastomeric coating 74 that is dyed a first predetermined color during the manufacturing process. Coating 74 is provided on select areas of top and bottom faces 52 and 53 and are screen printed onto central layer 29, or applied by other suitable methods. Accordingly, coating 74 serves as a visual indicator to clearly distinguish central layer 29 from active and spacer layers 26 and 28 and insures its proper positioning in gasket assembly 20. Preferably. coating 74 is an elastomeric bead that is placed around the periphery of cylinder bore openings 54 and oil and water ports 56, thus eliminating the need for any additional sealants, while increasing the scaling effectiveness around the openings 54 and 56. Alternatively, or in addition to a colored elastomeric coating 74, central layer 29 may be marked with a symbol or alpha-numeric code 76 on top and bottom faces 52 and 53 to visually distinguish central layer 29 from active and spacer layers 26 and 28, respectively.

Figure 9:
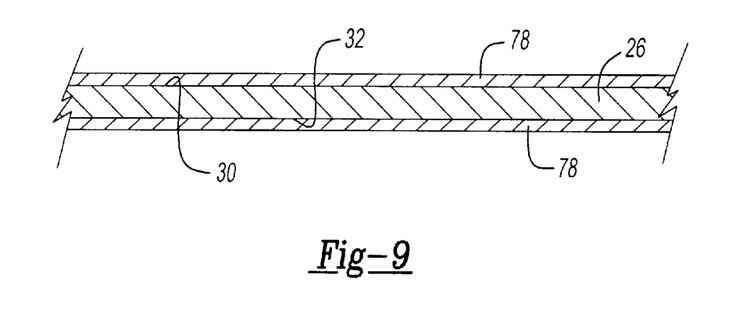
FIG. 9 is a cross-sectional view of an active gasket layer having an elastomeric coating thereon.

Referring to FIG. 9, active layers 26 are preferably provided with an elastomeric coating 78 having a second predetermined color on top and bottom faces 30 and 32. Coating 78 is pre-dyed during, the manufacturing process and applied utilizing a screen printing process or other suitable method. The second predetermined color serves as a visual indicator to distinguish active layers 26 from spacer layers 28 and central layer 29. Further, top and bottom faces 30 and 32 are entirely coated with elastomeric coating 78 to provide increased sealing effectiveness for mating components 22 and 24. Alternatively, or in addition to a colored elastomeric coating 78, active layers 26 may be marked with a symbol or alpha-numeric code 80 on top and bottom faces 30 and 32 to visually distinguish central layer 29 from active and spacer layers 26 and 28, respectively.

To permit easy selection of spacer layers 28, it is preferred that spacer layers 28 are provided with an alphanumeric marking or indicia. In particular, it is desirable to mark spacer layers 28 to visually indicate the thickness of each spacer layer 28 such that each spacer layer 28 is easily distinguishable from other spacer layers 28 to achieve a desired compression ration.

Preferred embodiments of the present invention have been disclosed. A person of ordinary skill in the art Would realize, however, that certain modifications would come within the teachings of this invention. Therefore, the following claims should be studied to determine the true scope and content of the invention.

What is claimed is:

1. A metallic gasket assembly for use in sealing mating components in an internal combustion engine and permitting selective variation of the compression ratio of the engine, said gasket assembly comprising:

at least two active layers, a first active layer and a second active layer, each having a plurality of active layer apertures formed therethrough and an active layer thickness defined by opposing top and bottom faces;

a central layer having a plurality of central layer apertures formed therethrough and a central layer thickness defined by opposing top and bottom faces; said central layer apertures corresponding to said active layer apertures;

at least one spacer layer having a plurality of spacer layer apertures formed therethrough and a spacer layer thickness defined by opposing top and bottom faces, said spacer layer apertures corresponding to said active and central apertures;

said active, central and spacer layers being arranged in face-to-face engagement with said central layer being positioned between said active layers with two of said active layers serving as outermost mounting surfaces of said gasket assembly such that said respective central and active layer apertures are aligned, wherein said at least one spacer layer is positioned between said central layer and one of said active layers such that said spacer layer apertures are aligned with said active and central layers;

wherein said active, central and spacer layers are removably engaged in face-to-face engagement such that one or more spacer layers may be selectively added or removed from said gasket assembly in a non-destructive manner to selectively vary the compression ratio of the engine when said gasket assembly is operatively connected to the vehicle engine; and wherein at least one of said central layer, active layers or said spacer layer is provided with a visual indicator to allow for distinguishing between said central layer, active layers and said spacer layer during selective assembly or re-assembly said gasket assembly to achieve varied compression ratios for the vehicle engine when said gasket assembly is operatively connected to the vehicle engine.

2. The gasket assembly of claim 1, wherein said central layer is provided with an elastomeric coating on said top and bottom faces, said coating being dyed a predetermined central layer color and serving as said visual indicator to distinguish said central layer from said active and spacer layers.

3. The gasket assembly of claim 2, wherein said elastomeric coating is in the form of a sealing bead disposed around a periphery of cylinder bore openings formed in said central layer.

4. The gasket assembly of claim 1, wherein said central layer is provided with a marking on at least one of said opposing faces and serving as said visual indicator to distinguish said central layer from said active and spacer layers.

5. The gasket assembly of claim 1, wherein said active layers are provided with an embossed bead on at least one of said opposing faces, said embossed bead serving as said visual indicator to distinguish said active layers from said central and spacer layers and increasing sealing effectiveness of said active layers.

6. The gasket assembly of claim 1, wherein said active layers are provided with an elastomeric coating on said top and bottom faces, said coating being dyed a predetermined active layer color and serving as a visual indicator to distinguish said active layers from said central and spacer layers.

7. The gasket assembly of claim 6, wherein said elastomeric coating coats substantially the entire surfaces of said opposing faces of said active layers.

8. The gasket assembly of claim 1, wherein said active layers are provided with a marking on at least one of said opposing faces to serve as said visual indicator to distinguish said active layers from said central and spacer layers.

9. The gasket assembly of claim 1, wherein said spacer layers are provided with a marking on at least one of said opposing faces to serve as said visual indicator to distinguish said spacer layers from said central and active layers.

10. The gasket assembly of claim 1, wherein said at least one spacer layer includes two spacer layers, a first spacer layer and a second spacer layer, said first spacer layer having a thickness that is greater than a thickness of said second spacer layer.

11. The gasket assembly of claim 10, wherein said first spacer layer is positioned between and arranged in face-to-face engagement with said first active layer and said central layer and said second spacer layer is positioned between and arranged in face-to-face engagement with said second active layer and said central layer such that said gasket assembly is arranged in an alternating manner.

12. The gasket assembly of claim 10, wherein each of said spacer layers are provided with a unique marking on at least one of said opposing faces to serve as said visual indicator to distinguish said spacer layers from said central and active layers and to distinguish each of said spacer layers from other spacer layers.

13. The gasket assembly of claim 1, further including a retaining mechanism for selectively and detachably securing said gasket assembly together into a single unit.

14. A metallic gasket assembly for use in sealing mating components in an internal combustion engine and permitting selective variation of the compression ratio of the engine, said gasket assembly comprising:

a plurality of active layers, each having a plurality of active layer apertures formed therethrough and an active layer thickness defined by opposing top and bottom faces, wherein said respective active layer thickness of each of said active layers are all substantially the same;

a central layer having a plurality of central layer apertures formed therethrough and a central thickness layer defined by opposing top and bottom faces; said central layer apertures corresponding to said active layer apertures;

a plurality of spacer layers, each having a plurality of spacer layer apertures formed therethrough and a spacer layer thickness defined by opposing top and bottom faces, said spacer layer apertures corresponding to said active and central apertures, wherein said respective thickness of each of said spacer layers are all substantially different;

said active, central and spacer layers being selectively arranged in face-to-face engagement in an alternating manner with said central layer being positioned between said active layers with two of said active layers serving as outermost mounting surfaces of said gasket assembly such that said respective central and active layer apertures are aligned, wherein at least one of said spacer layers is positioned between said central layer and each of said active layers such that said spacer layer apertures are aligned with said active and central layers;

wherein said active, central and spacer layers are removably engaged in face-to-face engagement such that one or more spacer layers may be selectively added or removed from said gasket assembly in a non-destructive manner to selectively vary the compression ratio of the engine when said gasket assembly is operatively connected to the vehicle engine;

wherein said central layer is provided with a visual indicator on at least one of said opposing faces to distinguish said central layer from said active layers and said spacer layer;

wherein each of said active layers are provided with a visual indicator on at least one of said opposing faces to allow for distinguishing said active layers from said central layer and said spacer layers during selective assembly or re-assembly said gasket assembly to achieve varied compression ratios for the vehicle engine when said gasket assembly is operatively connected to the vehicle engine; and wherein at least one of said central layer, active layers or said spacer layer is provided with a visual indicator to allow for distinguishing between said central layer, active layers and said spacer layer during selective assembly or re-assembly said gasket assembly to achieve varied compression ratios for the vehicle engine when said gasket assembly is operatively connected to the vehicle engine.

15. The gasket assembly of claim 14, wherein each of said spacer layers has a unique visual indicator on at least one of said opposing faces to distinguish each of said spacer layers from other of said spacer layers.

16. The gasket assembly of claim 14, wherein said central layer is provided with an elastomeric coating in the form of a sealing bead disposed on said top and bottom faces, said coating being dyed a predetermined central layer color and serving as said visual indicator to distinguish said central layer from said active and spacer layers.

17. The gasket assembly of claim 16, wherein said central layer further includes a marking on at least one of said opposing faces, said marking serving as said visual indicator to distinguish said central layer from said active and spacer layers.

18. The gasket assembly of claim 14, wherein said active layers are provided with an elastomeric coating on said top and bottom faces, said coating covering substantially the entire top and bottom faces, wherein said coating is dyed a predetermined active layer color and serving as a visual indicator to distinguish said active layers from said central and spacer layers.

19. The gasket assembly of claim 18, wherein said active layers further include a marking on at least one of said opposing faces to serve as said visual indicator to distinguish said active layers from said central and spacer layers.

20. A metallic gasket assembly for use in sealing mating components in an internal combustion engine and permitting selective variation of the compression ratio of the engine, said gasket assembly comprising:

a plurality of metallic active layers, each having a plurality of active layer apertures formed therethrough and an active layer thickness defined by opposing top and bottom faces, wherein said respective active layer thickness of each of said active layers are all substantially the same;

a central metallic layer having a plurality of central layer apertures formed therethrough and a central thickness layer defined by opposing top and bottom faces; said central layer apertures corresponding to said active layer apertures;

a plurality of metallic spacer layers, each having a plurality of spacer layer apertures formed therethrough and a spacer layer thickness defined by opposing top and bottom faces, said spacer layer apertures corresponding to said active and central apertures, wherein said respective thickness of each of said spacer layers are all substantially different;

said active, central and spacer layers being arranged in face-to-face engagement in an alternating manner with said central layer being positioned between said active layers with two of said active layers serving as outermost mounting surfaces of said gasket assembly such that said respective central and active layer apertures are aligned, wherein at least one of said spacer layers is positioned between said central layer and each of said active layers such that said spacer layer apertures are aligned with said active and central layers, said active, central and spacer layers being detachably and selectively secured together by removable fasteners;

wherein said one or more spacer layers may be selectively added to said gasket assembly to selectively lower the compression ratio of the engine, selectively removed in a non-destructive manner to selectively increase the compression ratio of the engine, or selectively substituted in a non-destructive manner with one or more additional spacer layers, said additional spacer layers having a thickness that differs from said thickness of said one or more spacer layers such that selectively substituting one or more of said additional spacer layers serves to selectively vary the compression ratio of the engine;

wherein said central layer is provided an elastomeric coating in the form of a sealing bead disposed on said top and bottom faces, said coating being dyed a predetermined central layer color and serving as a visual indicator to distinguish said central layer from said active and spacer layers;

wherein each of said active layers are provided are provided with an elastomeric coating on said top and bottom faces, said coating covering substantially the entire top and bottom faces, wherein said coating is dyed a predetermined active layer color and serving as a visual indicator to distinguish said active layers from said central and spacer layers; and wherein each of said spacer layers are provided with a unique marking to serve as a visual indicator, said marking being positioned on at least one of said opposing faces, said marking serving to distinguish each of said spacer layers from other spacer layers, as well as distinguishing said spacer layers from said central layer and said active layers during selective assembly or re-assembly said gasket assembly to achieve varied compression ratio for the vehicle engine when said gasket assembly is operatively connected to the vehicle engine.

21. A metallic gasket assembly for use in scaling mating components in an internal combustion engine and permitting selective variation of the compression ratio of the engine, said gasket assembly comprising:

at least two metallic active layers; and a metallic central layer; said active layers and central layer being arranged in selectively removable face-to-face engagement such that said central layer and said active layers may be selectively dis-assembled in a non-destructive manner and re-assembled to achieve varied compression ratio for the vehicle engine when said gasket assembly is operatively connected to the vehicle engine;

wherein one of said active layers and said central layer include a visual indicator to distinguish said layers from one another.

22. The metallic gasket assembly as claimed in claim 21, wherein said visual indicator is one of an elastomeric coating, marking or symbol.

23. A selectively adjustable gasket assembly kit for selectively varying the compressior ratio of a vehicle engine, comprising:

a plurality of metallic gasket layers;

wherein said plurality includes a first subset of multiple active gasket layers, a second subset of at least one spacer gasket layers and a third subset containing a central gasket layer;

wherein at least one subset is provided with a visual indicator to distinguish said at least one subset from the remaining subsets to assist in assembly and selective re-assembly of said gasket assembly;

wherein said first subset includes at least two active gasket layers, a first active layer and a second active gasket layer, each of said active gasket layers having a plurality of active layer apertures formed therethrough;

wherein said second subset includes at least one spacer layer, each of said spacer layers having a plurality of spacer layer apertures that generally correspond in size and shape to said active layer apertures;

wherein said central layer has a plurality of central layer apertures that generally correspond in size and shape to said active and spacer layer apertures;

said first, second and third subsets being arranged in an alternating manner with said active, spacer and central layer apertures aligned such that said third subset is positioned between gasket layers of said first subset and at least one gasket layer of said second subset is positioned between said gasket layer from said third subset and one of said gasket layers from said second subset to define a first predetermined compression ratio value; said first, second and third subsets being removably engaged such that said gasket assembly may be selectively dis-assembled;

wherein said gasket assembly may be modified to achieve a second predetermined compression ratio value that differs from said first compression ratio value by selectively disassembling said gasket assembly in a non-destructive manner, selectively adding or removing one or more spacer gasket layers, and re-assembly said gasket assembly.

* * * * *

UNITED STATES PATENT AND TRADEMARK OFFICE
CERTIFICATE OF CORRECTION

PATENT NO.     : 6,409,178 B1
DATED          : June 26, 2002
INVENTOR(S)    : Edward Raden et al.

It is certified that error appears in the above-identified patent and that said Letters Patent is hereby corrected as shown below:

<u>Column 11,</u>
Line 4, replace "for use in scaling mating" with -- for use in sealing mating --.
Line 24, replace "varying the compressior ratio" with -- varying the compression ratio --.

Signed and Sealed this

Tenth Day of December, 2002

JAMES E. ROGAN
*Director of the United States Patent and Trademark Office*